(12) United States Patent
Haumont

(10) Patent No.: US 7,764,773 B2
(45) Date of Patent: Jul. 27, 2010

(54) DETERMINING SERVICES ACCESSIBLE VIA A SUBSCRIPTION IN A COMMUNICATION SYSTEM

(75) Inventor: Serge Haumont, Helsinki (FI)

(73) Assignee: Nokia Corporation, Espoo (FI)

( * ) Notice: Subject to any disclaimer, the term of this patent is extended or adjusted under 35 U.S.C. 154(b) by 263 days.

(21) Appl. No.: 10/089,405

(22) PCT Filed: Jul. 31, 2001

(86) PCT No.: PCT/FI01/00688

§ 371 (c)(1),
(2), (4) Date: Jul. 17, 2002

(87) PCT Pub. No.: WO02/11460

PCT Pub. Date: Feb. 7, 2002

(65) Prior Publication Data

US 2003/0027554 A1 Feb. 6, 2003

(30) Foreign Application Priority Data

Aug. 2, 2000 (FI) .................................. 20001740

(51) Int. Cl.
*H04M 15/00* (2006.01)
(52) U.S. Cl. ..................... 379/114.17; 379/114.16; 379/114.19; 379/114.2; 455/414.1
(58) Field of Classification Search ............ 455/406, 455/414, 408, 419, 432.1, 566, 558, 433, 455/404.1, 414.1; 370/338; 379/114.03, 379/114.15–114.2, 114.29, 45
See application file for complete search history.

(56) References Cited

U.S. PATENT DOCUMENTS

| | | | | |
|---|---|---|---|---|
| 5,353,335 A | * | 10/1994 | D'Urso et al. ............ 379/114.2 |
| 5,450,477 A | * | 9/1995 | Amarant et al. ......... 379/114.17 |
| 5,586,175 A | * | 12/1996 | Hogan et al. ............ 379/114.14 |
| 5,592,535 A | | 1/1997 | Klotz | |
| 5,677,945 A | * | 10/1997 | Mullins et al. .......... 379/114.17 |
| 5,722,067 A | * | 2/1998 | Fougnies et al. ............. 455/406 |
| 5,748,720 A | * | 5/1998 | Loder .......................... 455/406 |
| 5,762,376 A | * | 6/1998 | Taskett ......................... 283/57 |
| 5,960,416 A | * | 9/1999 | Block ........................... 705/34 |
| 6,035,025 A | * | 3/2000 | Hanson .................... 379/114.2 |

(Continued)

FOREIGN PATENT DOCUMENTS

| | | |
|---|---|---|
| DE | 290 00 711 | 6/1998 |
| WO | WO 98/34393 | 8/1998 |
| WO | WO 00/19700 | 4/2000 |
| WO | WO 00/28746 | 5/2000 |
| WO | WO 0028746 A2 * | 5/2000 |

(Continued)

OTHER PUBLICATIONS

Lin et al., "Mobile Prepaid Phone Services," IEEE Personal Communications, Jun. 2000, pp. 6-14.

*Primary Examiner*—Simon Sing
(74) *Attorney, Agent, or Firm*—Harrington & Smith

(57) ABSTRACT

A method, a system and a network node for determining services accessible via a subscription having an account and at least a first limit in a communication system. The method includes defining at least a first set of services and a second set of services to be used with the subscription, each set of services defining services accessible via the subscription, comparing the balance of the account with the first limit, using the first set of services when the balance of the account does not reach the first limit, and using the second set of services when the balance reaches the first limit.

24 Claims, 2 Drawing Sheets

U.S. PATENT DOCUMENTS

| | | | |
|---|---|---|---|
| 6,058,300 A * | 5/2000 | Hanson | 455/406 |
| 6,097,948 A * | 8/2000 | Sjodin | 455/426.1 |
| 6,115,601 A * | 9/2000 | Ferreira | 455/406 |
| 6,137,872 A * | 10/2000 | Davitt et al. | 379/114.2 |
| 6,188,752 B1 | 2/2001 | Lesley | |
| 6,208,851 B1 * | 3/2001 | Hanson | 455/405 |
| 6,246,755 B1 * | 6/2001 | Walker et al. | 379/114.2 |
| 6,320,947 B1 * | 11/2001 | Joyce et al. | 379/114.2 |
| 6,337,903 B1 | 1/2002 | Manner | |
| 6,393,269 B1 * | 5/2002 | Hartmaier et al. | 455/406 |
| 6,463,139 B1 * | 10/2002 | Davitt et al. | 379/144.01 |
| 6,496,690 B1 * | 12/2002 | Cobo et al. | 455/408 |
| 6,571,221 B1 * | 5/2003 | Stewart et al. | 705/52 |
| 6,628,954 B1 * | 9/2003 | McGowan et al. | 455/461 |
| 6,711,147 B1 * | 3/2004 | Barnes et al. | 370/338 |
| 6,732,176 B1 * | 5/2004 | Stewart et al. | 709/227 |
| 6,741,686 B2 | 5/2004 | Bekkevold et al. | |
| 6,748,066 B1 * | 6/2004 | Espejo et al. | 379/114.2 |
| 6,760,417 B1 | 7/2004 | Wallenius | |
| 7,149,293 B1 * | 12/2006 | Coppage et al. | 379/114.2 |
| 7,162,220 B2 * | 1/2007 | Hanson | 455/405 |
| 7,269,251 B1 * | 9/2007 | Jokinen | 379/114.2 |
| 2002/0025028 A1 * | 2/2002 | Manto | 379/114.05 |
| 2002/0077107 A1 * | 6/2002 | Eng et al. | 455/445 |
| 2002/0087707 A1 * | 7/2002 | Stewart et al. | 709/230 |
| 2002/0133457 A1 * | 9/2002 | Gerlach et al. | 705/39 |
| 2003/0026404 A1 * | 2/2003 | Joyce et al. | 379/144.01 |
| 2003/0125011 A1 * | 7/2003 | Campbell | 455/406 |
| 2004/0077334 A1 * | 4/2004 | Joyce et al. | 455/406 |
| 2004/0171368 A1 * | 9/2004 | Senn et al. | 455/406 |
| 2005/0075957 A1 * | 4/2005 | Pincus et al. | 705/35 |
| 2006/0223531 A1 * | 10/2006 | Hanson | 455/435.1 |
| 2007/0061271 A1 * | 3/2007 | Ala-Luukko | 705/64 |

FOREIGN PATENT DOCUMENTS

| | | |
|---|---|---|
| WO | WO 00/65820 | 11/2000 |
| WO | WO 00/78080 | 12/2000 |
| WO | WO 01/06753 | 1/2001 |
| WO | WO 01/17222 | 3/2001 |
| WO | WO 01/60046 | 8/2001 |

* cited by examiner

DETERMINING SERVICES ACCESSIBLE VIA A SUBSCRIPTION IN A COMMUNICATION SYSTEM

This is a National Stage application of International Application No. PCT/FI01/00688, which was filed on Jul. 31, 2001, which designated the U.S., and was filed in the English language.

BACKGROUND OF THE INVENTION

The invention relates to services accessible via a subscription in a communication system, and particularly to a subscription having an account and a predetermined limit. Examples of such subscriptions are a prepaid subscription and a postpaid subscription with a limit indicating the maximum allowed amount to be billed. A postpaid subscription refers to a subscription which is charged in arrears.

Mobile communications systems have been developed in order to free people from fixed telephone terminals without hindering their reachability. Often the mobile communications network is an access network providing a user with wireless access to external networks, hosts, or services offered by specific service providers. The development of packet-switched services, such as the General Packet Radio Service GPRS in the Pan-European mobile communications system GSM (Global System for Mobile Communications), allowing packet data transmission between mobile data terminals and external data networks, enables the development of a variety of services. One example of such services are different WAP (Wireless access protocol) services via which service providers can provide services free of charge, i.e. services the usage of which is paid by the service provider and/or an advertiser.

Along with the mobile communications systems, a variety of services provided through mobile stations have also been developed. One example of new services becoming increasingly popular is a prepaid subscription. The prepaid subscription involves no billing in arrears but the account of the prepaid subscription is charged in real-time during calls. The prepaid subscription can usually be used for chargeable connections or services until the credit in the subscription's account runs out, in other words until the prepaid amount has been exhausted. Another service similar to the prepaid service is a postpaid service with a limited bill, i.e. a postpaid subscription with a limit indicating the maximum allowed amount to be billed. It differs from the prepaid subscription in that the subscription allows access to chargeable connections or services until the bill reaches the limit.

Both of these services are expected to be widely popular also for packet switched services. The problem related to the arrangement described above is that when the subscription does not allow access to chargeable calls, it does not allow access to services free of charge either. The prepaid subscription involves another problem, too. Usually, the subscriber to the prepaid subscription, or someone else, can deposit more money in the subscription's account. However, when the prepaid amount has been exhausted, money can not be deposited via the prepaid subscription.

BRIEF DESCRIPTION OF THE INVENTION

An object of the invention is to provide a method and an apparatus implementing the method to eliminate the above-mentioned problems. The objects are achieved with a method, a system and a network node which are characterized in what is disclosed in the independent claims. The preferred embodiments of the invention are set forth in the dependent claims.

The invention is based on defining at least two sets of services for the subscription having an account with a predetermined limit, one set of services being used when the predetermined limit has not been reached and the other when the predetermined limit has been reached. The latter set of services preferably comprises services free of charge. The most important advantage of the invention is that it provides access to certain services even when the subscription can not be used for connections or services to be charged from the subscription.

In a preferred embodiment of the invention the sets of services are defined for a prepaid service and at least the second set of services comprises a depositing service. This has the advantage that the user can deposit money in his prepaid account also when the balance of the prepaid account has been used. Furthermore, this is a very convenient way to deposit money in one's prepaid account.

In one embodiment of the invention in response to the second set of services the user is informed of the services accessible via the second set of services. This has the advantage that the user knows for what he can use his subscription. He may even receive information how to renew the subscription and/or how to use some other service(s) available.

BRIEF DESCRIPTION OF THE FIGURES

The invention will be described in greater detail by means of preferred embodiments with reference to the accompanying figures, in which.

DETAILED DESCRIPTION OF THE INVENTION

The present invention is applicable to any system providing prepaid subscriptions and/or postpaid subscriptions with limited bills. The present invention is particularly well applicable to any packet switched system in which an individual packet data address is activated as in the GPRS service before it can be used. These systems include the 'third-generation mobile communication systems', such as the Universal Mobile Telecommunications System (UMTS) and IS-41 (Interim Standard), mobile communication systems corresponding to the GSM system, such as the DCS 1800 (Digital Cellular System for 188 MHz) and PCS (Personal Communication System), and WLL systems which are based on the above-mentioned systems and implement a GPRS-type packet radio. Furthermore, the invention can be applied in systems other than mobile communication systems, such as cable modem networks and similar fixed systems. The invention will be described in the following using the GPRS service of the GSM system as an example, but the invention is not limited to such a system. The definitions of mobile communication systems evolve rapidly, which may necessitate additional changes to the invention. For this reason, all the terms and expressions should be interpreted broadly, and it should also be kept in mind that they are only intended to describe the invention, not to limit it. For example, in IP networks there are policy repository points and policy decision points in which the functions described later can be implemented instead of HLRs and SCPs. The function is essential for the invention, not the network node in which the function is located.

Figure 1:
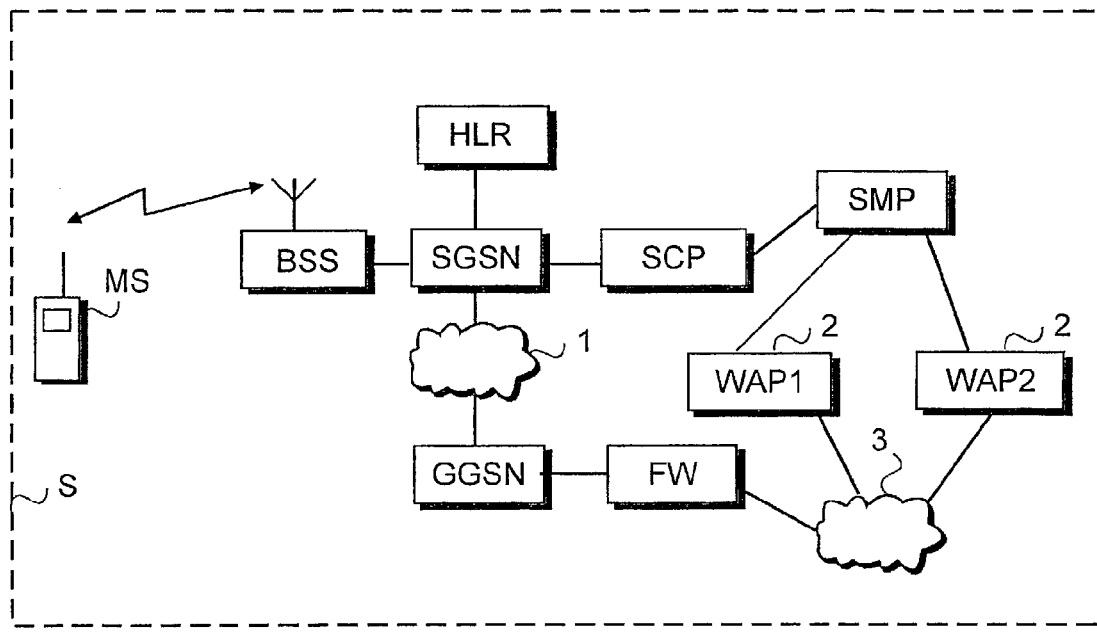
FIG. 1 is a simplified block diagram of a system providing the GPRS.

FIG. 1 shows a simplified network architecture according to a first preferred embodiment of the invention, describing only some of the elements of a system architecture. The network nodes illustrated in FIG. 1 are logical units, the implementation of which may differ from the one described. It is obvious to one skilled in the art that the system may also comprise other functions and structures which need not to be described in closer detail here.

FIG. 1 illustrates the network architecture of a GPRS service S according to the first preferred embodiment of the invention at a general level because a more detailed structure of the network is irrelevant to the invention. The structure and function of the GSM system are very familiar to a person skilled in the art. The structure of the GPRS service is defined e.g. in ETSI specification 03.60, version 6.0.0 (Digital cellular telecommunications system (Phase 2+); General Packet Radio Service (GPRS); Service Description; Stage 2), which is incorporated herein by reference. The GPRS service comprises an access network which provides radio access and is represented by the base station subsystem BSS of the GSM system in FIG. 1. In the third generation (3G) mobile communications systems, such as the Universal Mobile Telecommunications System (UMTS), the access network is Radio Access Network (RAN), whereas the GPRS network is a core network (CN) connected to the RAN. The GPRS service also comprises, as edge nodes, support nodes of the GPRS service for packet switched transmission of data between a packet data network and a mobile station MS. The support nodes include a serving GPRS support node SGSN and a gateway GPRS support node GGSN. These support nodes SGSN and GGSN are interconnected by a backbone network 1. It should be noted that the functionalities of the SGSN and the GGSN can also be physically combined into the same network node, in which case the operator's backbone network is unnecessary. Logically the nodes are, however, separate nodes.

The GPRS interface comprises for a mobile station MS one or more individual PDP (packet data protocol) contexts which describe the packet data address the MS can use to send and receive data packets when the PDP context is active. Thus the PDP context can be seen as a connection. The PDP context defines different data transmission parameters, such as the PDP type (e.g. X.25 or IP), PDP address (e.g. IP address), quality of service QoS, access point name APN and NSAPI (Network Service Access Point Identifier). The APN of the PDP context is used by the SGSN to select the appropriate GGSN (supporting this specific APN). The APN configuration in the GGSN defines where and how to connect the user of the PDP context. Thus the APN can be used to define a set of services. A certain level of security (e.g. is password required or not), a certain way to collect charging information, a certain address range, etc. can be linked to the APN. The billing system can also be configured to bill different APNs differently. In the first and second preferred embodiment of the invention the different sets of services are defined by using different APNs, as described later.

The serving GPRS support node SGSN serves the mobile station MS. Each support node SGSN produces a packet data service for mobile data terminals, i.e. mobile stations MS, within the area of one or more cells in a cellular packet radio network. For this purpose, each support node SGSN is typically connected to the GSM mobile communication system (typically to the base station controller in the base station subsystem BSS) so that the intermediate mobile communication network provides radio access and packet switched data transmission between the SGSN and the mobile stations. In other words, the mobile station MS in a cell communicates with a base station over the radio interface and further through the base station subsystem with the support node SGSN to the service area of which the cell belongs. The main functions of the SGSN node are to detect new GPRS mobile stations in its service area, to carry out registration of new mobile stations MS together with GPRS registers, to send data packets to or to receive them from the GPRS mobile station and to maintain a file on the location of the mobile stations MS within its service area. This means that the SGSN performs security functions and access control, such as authentication and encryption procedures and determination of the APN(s) this mobile station is allowed to access. The SGSN can participate in collecting the billing information. The SGSN according to the first and second preferred embodiment of the invention comprises a function similar to the service switching function in the intelligent network. In other words, the SGSN functions as a service switching point SSP of the intelligent network.

The GPRS gateway support nodes GGSN connect the operator's GPRS network to the external systems, data networks, such as an IP network (Internet) or an X.25 network, and servers. The GGSN can also be directly connected to a private company network or to a host. In the example of FIG. 1, the GGSN is connected to the servers 2 via the Internet network 3 and to the Internet network 3 via a firewall FW. It should be understood that other kind of connections are also possible. The GGSN comprises GPRS subscribers' PDP contexts and routing information, i.e. the SGSN addresses. The GGSN functions as a router between an external address and internal routing information (e.g. SGSN). The GGSN may also transmit packets from one mobile station to another within the network. In addition, the GGSN is responsible for billing of data traffic.

The firewall FW configuration can apply a specific screening policy to a certain address range, that is to a certain APN. For example, the screening policy can restrict access of certain application, restrict establishment of an IP connection from certain addresses and/or restrict sending/receiving packets to/from certain address.

The mobile station MS may be any mobile node which supports packet data transmission and has a radio interface to the network. It can be, for example, a laptop PC which is connected to a cellular phone capable of packet radio operation, or an integrated combination of a small computer and a packet radio phone. The other embodiments of the mobile station MS include various pagers, remote-controllers, monitoring and/or data acquisition devices, etc. The mobile station may also be called a mobile node or a mobile host. The mobile station MS comprises an actual mobile equipment ME and a detachably connected identification card SIM, also called a subscriber identity module. In this context, a mobile station MS generally means the entity formed by the SIM card and the actual mobile equipment. The SIM card is a smart card that holds the subscriber identity, performs authentication algorithms, and stores authentication and encryption keys and some subscription information that is needed in the mobile station. The mobile equipment ME is the radio terminal used for radio communication over the radio interface.

Subscription data on each subscription of the network is stored permanently or semi-permanently in a home location register HLR in such a manner that the subscription data is connected to the subscriber's identifier IMSI. The subscription data includes routing information, i.e. the current location of the subscriber, and information on the services the subscriber can access. The subscription data also includes information on the subscribed APNs.

In the first and second preferred embodiment of the invention two different kind of servers 2 are used in order to restrict access to services free of charge. In the first preferred embodiment chargeable services are provided via a server WAP1 and services free of charge are provided via a server WAP2. An example of a free of charge WAP service is a depositing service, which allows to deposit money in the prepaid account. The depositing service is described in greater detail with FIG. 5. Another example is an advertisement, for example a map showing the location of the nearest McDonalds restaurant.

In the first preferred embodiment of the invention illustrated in FIG. 1, it is assumed that the prepaid service is implemented as an intelligent network service. In association with an intelligent network service, a service program is started at the service control point SCP, the operation of the program determining the messages transmitted by the SCP to the SSP at each stage of a call. In a prepaid service, each prepaid subscription has its own account the balance of which is reduced during an ongoing call charged from the subscription. The balance of the account is updated and monitored usually in the SCP. In the GPRS the SCP is usually a CAMEL (Customised Applications for Mobile network Enhanced Logic) Service Environment. The CAMEL is, like the GPRS, also a GSM 2+ phase service. The functionality of the SCP according to the first preferred embodiment is described in greater detail with FIG. 2.

In the second preferred embodiment of the invention it is also assumed that the prepaid service is implemented as an intelligent network service. In the second preferred embodiment of the invention (not shown in FIG. 1) the SCP is also connected to the HLR in order to enable the SCP to modify the subscription data, for example the subscribed APN. The functionality of the SCP according to the second preferred embodiment is described in greater detail with FIG. 3.

In the example illustrated in FIG. 1, the prepaid subscription information, including the balance of the account, is in a database located in a service management point SMP. The SMP may also monitor and update the balance of the account during an ongoing call. When the balance is monitored in some other network node, the network node monitoring the balance (usually the SCP) updates the balance of the subscription during an ongoing call. Alternatively, the prepaid subscription information may be located in different databases and/or in some other network element, such as the home location register HLR or a separate prepaid server.

In addition to means required to implement the prepaid service and/or postpaid service with a limited bill according to the prior art, the telecommunications system implementing the functionality of the present invention also comprises means for maintaining at least two different sets of services, means for comparing the balance of the account to a predefined limit and means for selecting the set of services to be used on the basis of the comparison. Current network nodes comprise processors and memory, which can be utilized in the functions of the invention. All changes required for implementing the invention can be carried out as added or updated software routines and/or with application circuits (ASIC).

Figure 2:
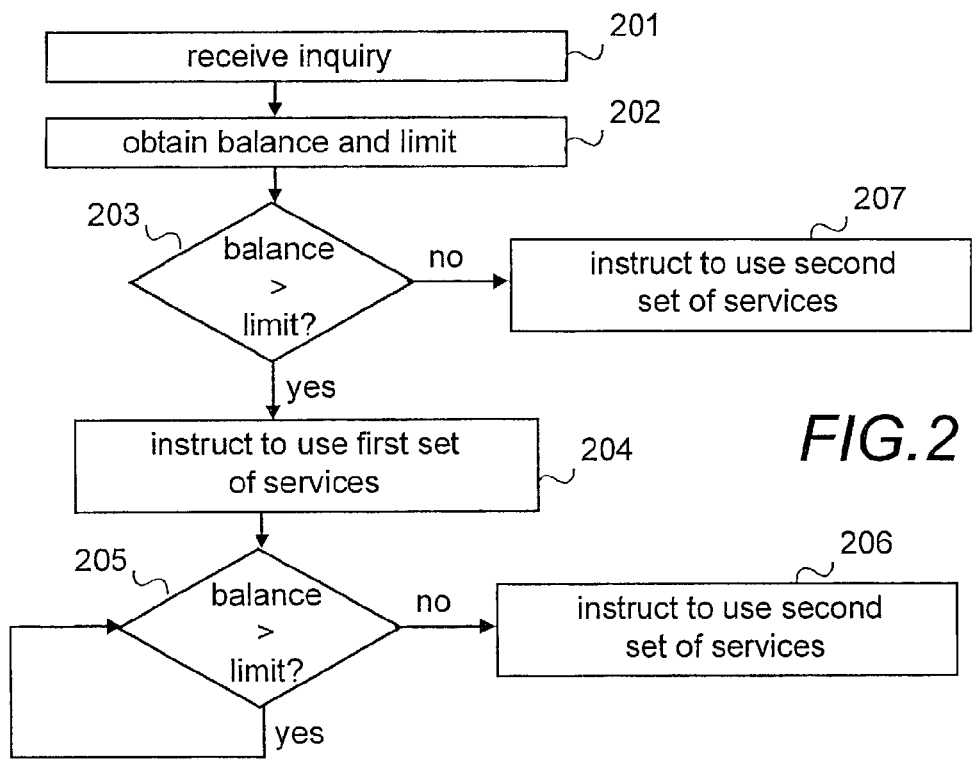
FIG. 2 is a flow chart illustrating the functionality of an SCP in a first preferred embodiment of the invention.
Figure 3:
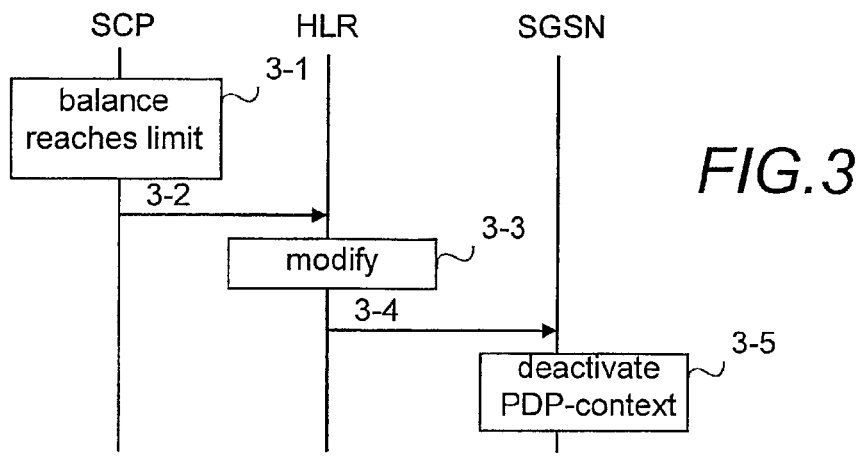
FIG. 3 is a signalling chart illustrating a second preferred embodiment of the invention.
Figure 4:
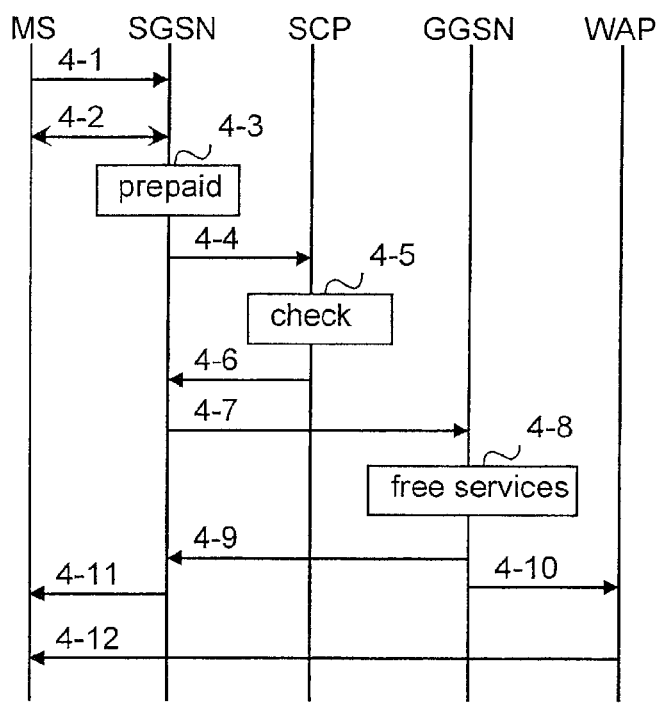
FIG. 4 is a signalling chart illustrating the signalling according to the first preferred embodiment of the invention.

FIGS. 2 and 4 illustrate the first preferred embodiment of the invention and FIG. 3 illustrates the second preferred embodiment of the invention. In the examples illustrated in FIGS. 2, 3 and 4 it is assumed that the subscription is a prepaid subscription in which the preset minimum balance of the account is zero. When the balance is the minimum balance, only a set of services free of charge is allowed in the first and second preferred embodiment of the invention. The set includes emergency calls.

In the first and second preferred embodiment of the invention the different sets of services are defined by using different APNs. In the first and second embodiment of the invention the first set of services comprises both services charged from the subscription and services free of charge including the depositing service, and the second set of services comprises only the services free of charge including the depositing service. Thus the second set of services is a subset of the first set of services. The first set of services is used when the balance of the account has not reached the minimum balance. For the first set of services a first APN is configured into the GGSN and for the second set of services a second APN is configured into the GGSN. The first APN which provides access to the first set of services allows access to both WAP servers, WAP1 and WAP2, illustrated in FIG. 1. The second APN which provides access to the second set of services allows access only to the server providing services free of charge (i.e. WAP2 in FIG. 1). This can be implemented by applying a restrictive screening policy in the firewall to the range of address allocated to the second APN, for example.

FIG. 2 is a flowchart representing the functionality of the SCP according to the invention in the first preferred embodiment. For the sake of clarity it is assumed that the APN which is selected can be accepted. In the first preferred embodiment of the invention the first APN is stored in subscription information in the HLR as the subscribed APN and the second APN is common to all prepaid subscribers and stored in the SCP.

In FIG. 2 the SCP receives an inquiry from an SGSN concerning a prepaid subscription, in step 201. The inquiry is triggered by 'attach request' or 'PDP context activation request', for example. In response to the inquiry the SCP obtains, in step 202, the balance of the account for the subscription and the predefined limit, which is the preset minimum value in the first preferred embodiment of the invention. In step 203, the SCP checks whether the balance exceeds the limit. In other words, the SCP checks whether has the balance has reached the limit. If the balance exceeds the limit (step 203), the SCP indicates in its response, in step 204, that the first set of services is used. In other words, the SCP indicates that the first APN is used. In the first preferred embodiment of the invention this indication is a normal response (i.e. 'continue normally') to the inquiry, and the SGSN interprets this to mean the APN which is in the subscription information in the HLR, i.e. the first APN.

The SCP monitors the balance of the account when the PDP context (and the set of services used) allows services charged from the subscription. When the balance of the prepaid account reaches the limit (step 205) at which services charged from the subscription are no longer allowed, the SCP triggers (step 206) the deactivation of the PDP context in the first preferred embodiment of the invention. This deactivation may comprise a message sent by the WAP server to the mobile station, the message informing the user the balance has reached the limit and recommending the user to deposit money in the account. At the same time the SCP reduces the quality of the service QoS in order to minimize the costs in the first preferred embodiment of the invention.

If the balance does not exceed the limit (step 203), the SCP indicates in its response in step 207 that the second set of services are used. In other words the SCP indicates that the second APN is used. In the first preferred embodiment of the invention the SCP sends in response to the inquiry the name of the second APN to be used in step 207. This second APN overrules the subscribed APN if the subscribed APN is something else than a wildcard. (Wildcard means that any APN is acceptable.) If the mobile station has requested an APN, it is overruled by the second APN. In the first preferred embodiment of the invention the second APN is configured in the SCP and it is common to all prepaid subscribers using a prepaid service of this service provider.

In embodiments where the SCP sends the name of the APN to be used in step 207 in the response to the inquiry received in step 201, the APN definitions may, instead of being in the SCP, be in subscription information maintained either in the home location register HLR or in the service management point SMP or in a corresponding network node where information concerning the prepaid subscription is maintained. In these embodiments it is also possible that the second APN is subscriber-specific. In these embodiments the SCP receives the second APN as part of the subscriber information regardless of whether the second APN is common to all subscribers or subscriber-specific.

In some other embodiment of the invention the SCP may send the name of the first APN to the SGSN in step 204. This APN then overrules the APN in subscriber information and/or requested by the mobile station.

In some other embodiment of the invention the message sent in step 204 includes an explicit indication indicating that chargeable services are allowed and the SGSN then selects the APN according to the prior art.

In some other embodiment of the invention the SCP may in step 207 send, instead of the name of the second APN, an indication to the SGSN indicating that only services free of charge are allowed. This indication can be the message itself, i.e. the SGSN receives a reply from the SCP that calls are not allowed and the SGSN interprets this to mean the second APN. In this embodiment the second APN is either preconfigured to the SGSN or the SGSN has means to find it, for example by requesting it from the HLR or from the SMP.

In some other embodiments of the invention the set of services which can be used is indicated with the charging characteristics to be applied. The charging characteristics indicate to the SGSN how to collect charging information. For example, when the charging characteristics is 'not collect charging information', it is interpreted to mean that the subscriber is allowed to use only services free of charge. Correspondingly, the charging characteristics indicating 'collect charging information', is interpreted to mean that the subscriber is also allowed to use chargeable services, i.e. the first set of services. In these embodiments the first and/or second APN can be preconfigured to the SGSN or the SGSN has means to find them (or the other ones not preconfigured in the SGSN), for example in the HLR or in the SMP.

In some embodiments of the invention a set of limits is defined for the prepaid account, one limit being the limit after which only services free of charge are allowed. In the embodiments the SCP monitors all limits after step 204. Some limits may trigger sending of a special message to the mobile station MS. One example is a message sent by the WAP server to the mobile station, the message informing the user that the balance will soon reach the limit and recommending the user to deposit money in the account. Some limits may trigger changes to the access rights, such as reduction of the QoS in order to minimize the costs. The SCP can take care of the reduction or the HLR takes care of the reduction after receiving a triggering impulse from the SCP.

FIG. 3 illustrates the functionality of the SCP in the second preferred embodiment of the invention in a situation where the PDP context has been established with the first set of services. In other words, the mobile station has access to services charged from the prepaid account.

In the second preferred embodiment of the invention the SCP is connected to the HLR. In the second preferred embodiment of the invention there are two different APNs in the subscriber information in the HLR, one of them being the first APN allowing also access to chargeable services and the other one the second APN allowing access only to services free of charge. In the second preferred embodiment of the invention the HLR also contains a flag, for example, which indicates which one of these two APNs is the allowed APN, i.e. the subscribed APN. Thus the HLR has the first and second APN preconfigured for this subscriber, and is ready to use one of them as the allowed APN in the subscriber information sent to the SGSN, for example. In the second preferred embodiment of the invention the SCP takes care of this flag. When the balance of the account exceeds the limit, the first APN is the allowed APN, and when the balance does not exceed the limit, the second APN is the allowed APN. The HLR sends the allowed APN to the SGSN as part of the subscription information.

Referring to FIG. 3, the SCP monitors the balance in point 3-1 until it reaches the preset minimum value. When the balance reaches the minimum value, the SCP sends an instruction to set the second APN as the allowed APN to the HLR in message 3-2. The instruction may contain the name of the second APN and/or an indication indicating that only services free of charge are allowed.

In response to message 3-2 the HLR sets the second APN as the allowed APN. In other words, the HLR modifies the subscription information in point 3-3. In response to modifying the subscription information the HLR sends, according to the prior art, message 3-4 to the SGSN in order to modify the subscription data stored in the SGSN. In response to message 3-4 the SGSN notices that an active PDP context was activated with subscription information which is not valid anymore and, according to the prior art, triggers the deactivation of the PDP context in point 3-5.

When the mobile station MS reactivates its PDP context next time, it is connected to the second APN (assuming that the MS always requests the subscribed APN, i.e. no APN is configured in the MS.)

Similarly, when some money is added to the account, the SCP sends an instruction to the HLR to set the first APN as the allowed APN. This instruction triggers the deactivation procedure and as a result of the reactivation after the latter deactivation, that the MS will be connected to the first APN.

In one embodiment of the invention the subscription information in the HLR includes only the allowed APN. In this embodiment, the instruction sent from the SCP (e.g. message 3-2) contains the name (or other identity or a wildcard) of the APN to be used as the allowed APN and the HLR replaces the name in the subscription information with the name included in the instruction.

In some other embodiments of the invention some other entity maintaining the balance, such as the SMP or a prepaid server, will ensure that the HLR knows which APN is the allowed APN, i.e. the subscribed APN.

FIG. 4 illustrates the activation of the PDP context initiated by the mobile station in the first preferred embodiment of the invention in a situation where the balance of the prepaid account has reached the preset minimum value and only services free of charge are available. The PDP context can be activated when the mobile station attaches to the GPRS network. Alternatively, the mobile station may activate the PDP context later or activation may be performed as a result of an activation request received from the GPRS network (GPRS network requested PDP context activation). The PDP context is created using a GTP protocol (GPRS Tunnelling Protocol).

In FIG. 4 it is assumed for the sake of clarity that the mobile station has made its presence known to the network by carrying out a GPRS attach operation. When the mobile station MS attaches to the GPRS network (in a GPRS attach procedure), the SGSN creates a mobility management context (MM context) and a logical link LLC (Logical Link Control) is established between the mobile station MS and the SGSN node in a protocol layer. The MM context is stored in the SGSN node and mobile station MS. The MM context of the SGSN node may contain subscriber data, such as the subscriber's IMSI, TLLI (Temporary Logical Link Identifier) and location and routing information, etc.

Referring to FIG. 4, the mobile station MS activates the PDP context by sending message 4-1 (Activate PDP Context Request) to the SGSN. In message 4-1 the mobile station provides information on the TLLI, PDP type, requested QoS and NSAPI, and optionally on the PDP address and access point name APN. With messages 4-2 the MS and the SGSN execute security functions, such as authentication of the subscriber using the subscription.

Since the subscription is a prepaid subscription, the SGSN encounters a subscription-specific trigger (detection point) in point 4-3, as a result of which it requests context processing instructions from the SCP in message 4-4.

In point 4-5, the SCP checks the balance of the prepaid account. Since in the example illustrated in FIG. 4 the balance has reached the preset minimum value, the SCP sends instructions to use the second APN in message 4-6. In the first preferred embodiment of the invention the SCP sends the name of the second APN. In message 4-6, in the first preferred embodiment the SCP sends, in addition to the second APN, the charging characteristics to be applied. The charging information will further be transmitted to the GGSN and Charging Gateway. The SCP may also return other information such as which GGSN PLMN to select for the connection (e.g. a home PLMN, a visited PLMN, etc.). By controlling the selection of the network of the GGSN the SCP can make sure that the set of services is the one it ought to be; since the APN defines a set of configuration in a given GGSN and if many operators use the same APN, they may not have exactly the same configuration. (The configuration defines allowed services.)

The SGSN sends message 4-7 (Create PDP Context) to the GGSN node, the message 4-7 including the name of the second APN and an indication indicating that the APN to be used is the second APN. In other words, the message 4-7 indicates to the GGSN that the APN allowing access only to services free of charge is used with this PDP context. After receiving the message 4-7, the GGSN creates the PDP context in point 3-8 and sends it to the SGSN in message 4-9 (Create PDP Context response). The GGSN is in the first preferred embodiment configured to send message 4-10 to a WAP server of the system in response to a PDP context using the second APN.

The SGSN sends the PDP context to the mobile station MS in message 4-11 (Activate PDP Context Response). The PDP context is stored in the mobile station MS, SGSN node and GGSN node. In the SGSN, each PDP context is stored together with the MM context.

In response to the message 4-10 the WAP server sends message 4-12 to the mobile station MS. Message 4-12 contains information about free services, such as the possibility of depositing money in the account, possibility of changing prepaid subscription to postpaid subscription, and other services offered by the partners to the end users as free of charge services.

If the SCP finds out in step 4-5 that the balance has not reached the limit (the preset minimum balance of the account), the SCP indicates in the first preferred embodiment of the invention that the first APN is used. Then the message 4-7 indicates the use of the first APN and the messages 4-10 and 4-12 are not sent.

In some other embodiments where the GGSN is arranged to send the name of the used APN to the WAP server and the WAP server is arranged to inform the user of the allowed services, the messages 4-10 and 4-12 are sent regardless of which APN is used.

In some embodiments of the invention the messages 4-6 and/or 4-7 may not contain the name of the second APN but an indication indicating that only services free of charge are allowed.

In some embodiments of the invention the message 4-7 contains only the name of the second APN, i.e. it does not indicate to the GGSN in any way that only services free of charge are allowed. In these embodiments messages 4-10 and 4-12 are sent only if the GGSN is arranged to send the name of the used APN to the WAP server and the WAP server is arranged to inform the user of the allowed services.

In other embodiments of the invention message 4-10 triggering message 4-12 is sent to the WAP server from the SCP or the SGSN, or, from a DHCP or a RADIUS server. The DHCP or the RADIUS server may receive the information triggering the message 4-10 during the PDP context activation, for example, when the GGSN requests the DHCP server to allocate a PDP address to the user or the RADIUS server to authenticate the user.

In the second preferred embodiment of the invention the SCP does not perform the checking in point 4-5 since the HLR delivers the APN to be used with this PDP context. The SCP responds to message 4-4 by sending charging information and/or some related information in message 4-6, but the message 4-6 does not contain the name of the APN nor an explicit indication which APN is to be used.

Figure 5:
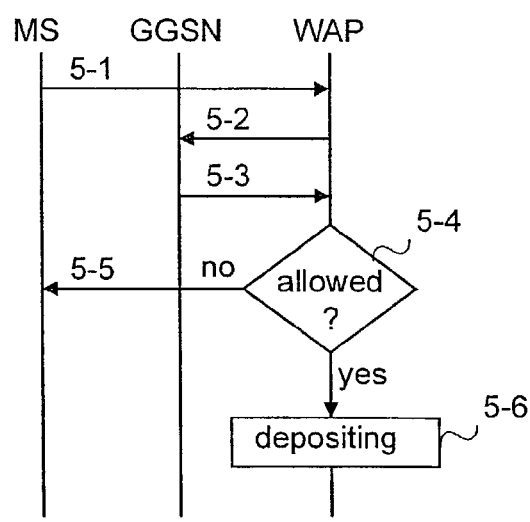
FIG. 5 is a flow chart of a depositing service in the first preferred embodiment of the invention.

FIG. 5 illustrates the depositing service in the first preferred, embodiment of the invention. In the first preferred embodiment of the invention the depositing service is a service located in the WAP server. For the sake of clarity it is assumed that there is an interface between the depositing service and the SMP maintaining the prepaid accounts.

The mobile station MS sends message 5-1 to the WAP server, which indicates that the user of the mobile station wants to deposit money in the account of the subscription. The depositing service needs authenticated access so that the operator can be sure who is depositing (and in group prepaid subscriptions it is also checked whether he has the right to deposit) and the one depositing can not deny this money adding. Since during the PDP context activation the mobile station (more precisely the SIM card) is authenticated by means of GSM procedures and the user is optionally authenticated with a password, the WAP server can trust the information received from the GPRS system. The WAP server requests user identification information from the GGSN in message 5-2. The GGSN obtains the user identification information from the PDP context the mobile station MS used when it sent message 5-1, and sends the user identification information to the WAP server in message 5-3. The user identification information is for example IMSI, or the phone number of the mobile station MSISDN.

After receiving message 5-3, the WAP server checks in point 5-4 whether the user is allowed to deposit. For example, a prepaid group subscription is a subscription where subscribers belonging to a group share one common prepaid subscription account, but only some of the members are allowed to deposit.

If the user is not allowed to deposit, the WAP server sends message 5-5 to the user informing him that he is not allowed to deposit.

If the user is allowed to deposit, the WAP server starts the actual depositing service in point 5-6. Depositing service can be based on the known (and authenticated) identity of the user, and an agreement between the user and the operator on how to transfer money (based on the credit card number, for example). Since the actual depositing service bears no significance to the invention, it is not described here in more detail.

After depositing the balance of the account will again exceed the limit and during the next PDP context activation the MS is connected to its first set of services.

In the second preferred embodiment of the invention the WAP server acknowledges the depositing to the SCP and in response to this acknowledgement the SCP instructs the HLR to change the allowed APN to the first APN. This triggers the deactivation and reactivation of the PDP context as described earlier.

In some other embodiments of the invention the WAP server may receive the identity of the subscriber (message 5-3) from some other server than the GGSN, such as a DNS server, a RADIUS server, a DHCP server, another WAP server or a policy server. In these embodiments of the invention the WAP server requests user identification information from the said other server in message 5-2. The said other server has obtained the identity of the user using a given PDP address from the GGSN during the PDP context activation, and thus the said other server can obtain the user identification information from its database and send it to the WAP server in message 5-3.

In some other embodiments of the invention the WAP server may receive the identity of the subscriber during the PDP context activation (e.g. in message 4-10 of FIG. 4) from the GGSN. The WAP server then keeps the relation between the PDP address and the user identity in its memory and messages 5-2 and 5-3 are not needed.

The steps, signalling messages and points shown in FIGS. 2, 3, 4 and 5 are not in absolute chronological order and they can be carried out in a different order from the given one. Other signalling messages can be transmitted and/or other functions can also be carried out between the steps and/or the messages and/or points. The signalling messages are only examples and may comprise several separate messages for transmitting the same information. In addition, the messages may also comprise other information. Furthermore, the messages may be named differently from the above-mentioned messages.

Although the invention has been described above assuming that the different sets of services are provided via different WAP servers, it is also possible to provide the different sets of services via one WAP server by indicating to the WAP server which services are allowed. The indication can be provided in many ways, for example:

1) The GGSN sends the indication indicating the allowed services to the WAP server when the MS activates its PDP context. This indication is preferably an APN and it is sent to the WAP server with the RADIUS protocol, for example.

2) Either the GGSN, the SGSN or the SCP sends the indication to another server (not the WAP server) when the MS activates its PDP context. Before delivering a requested service, the WAP server checks from the other server whether the MS is allowed to access the requested service. One example of another servers is the RADIUS server.

3) Before delivering a requested service, the WAP server checks from another server whether the MS is allowed to access the requested service.

4) The GGSN sends an implicit indication indicating the allowed services to the WAP server when the MS activates its PDP context. The implicit indication is preferably the PDP address which the MS uses. This implementation utilizes the fact that the PDP address corresponds to the APN and the APN can force the PDP address to belong to a certain range of addresses. In this implementation the WAP server has a preconfigured range of PDP addresses linked to corresponding service access rights. Thus the WAP server can deduce from the PDP address used by the MS which services are allowed.

Although the invention has been described above in connection with WAP servers, it is obvious to one skilled in the art that the invention can be implemented with any other application server, such as an imode, server and a web server.

Although the invention has been described above in connection with different APNs defining different sets of services, it is obvious to one skilled in the art that the invention can be implemented with any other parameter or service used for service access authorisation. One example is call barring. Another example is maintenance of information on screening policies defined for different sets of services. Also, a range of allowed addresses can be defined for each set of services or to a set of services. One can also define the allowed services with the QoS parameter. The QoS parameter may either allow or not allow a real-time service, for example. When a real-time service is not allowed, services allowing e.g. realtime video download or voice over IP (VoIP) can not be used. Different parameters and services can also be combined to define a set of services.

Although the invention has been described above in connection with the intelligent network IN and the SCP, it is obvious to one skilled in the art that the invention can be implemented with a non-IN based solution. One example is a prepaid server acting like the SCP in the second preferred embodiment of the invention. The prepaid server may receive charging records from the SGSN and/or the GGSN in real time (e.g. based on charging characteristics indicating a prepaid subscription in subscription information). The prepaid server maintains the balance of the account, and when the balance reaches one predefined limit, it instructs the HLR (like the SCP in FIG. 3).

Although the invention has been described above in connection with a prepaid subscription, it is obvious to one skilled in the art that the invention can also be applied in connection with a postpaid subscription with a limited bill. As stated earlier, the latter subscription differs from the prepaid subscription in that the predefined limit (the maximum allowed amount to be billed) is reached when the balance equals the limit. So, if the balance is below the limit, the charged services are allowed. It is also possible to use a service similar to the depositing service described in FIG. 5, to raise the value of the predefined limit.

It is to be understood that the above description and the figures related to it are only intended to illustrate the present invention. It will be obvious to a person skilled in the art that the invention may be modified in different ways without deviating from the scope and spirit of the invention disclosed in the appended claims.

The invention claimed is:

1. A method comprising:
   determining services accessible via a subscription having an account and at least a first limit in a communication system;
   defining at least a first set of services and a second set of services to be used with the subscription, each of said first and said second set of services defining services accessible via the subscription;
   defining a first access point name for the first set of services;
   defining a second access point name for the second set of services;
   comparing a balance of the account with the first limit;
   selecting, in response to the result of the comparison, a range of allowed IP addresses to be used for accessing one of said first and second set of services, wherein
   the first range of allowed IP addresses is selected when the balance of the account does not reach the first limit; and
   the second range of allowed IP addresses is selected when the balance reaches the first limit.

2. A method as claimed in claim 1, the communication system comprising a firewall, the method further comprising defining accessible services via a set of services by defining at least a firewall configuration for the set of services.

3. A method as claimed in claim 1, the method further comprising using in the communication system access point names to define where and how to connect the user of the subscription; and linking each defined range of allowed IP addresses to an access point name.

4. A method as claimed in claim 1, the method further comprising indicating a particular set of services which is to be used by charging characteristics to be applied.

5. A method as claimed in claim 1, the second set of services comprising free of charge services.

6. A method as claimed in claim 1, the method further comprising informing the user of the subscription of the services accessible via the second set of services in response to using the second set of services.

7. A method as claimed in claim 1, wherein:
   the subscription is a postpaid subscription;
   the first limit is the maximum allowed amount of the bill; and
   the balance of the account indicates the amount of the bill to be charged from the subscription.

8. A method as claimed in claim 1, wherein:
   the subscription is a prepaid subscription;
   the first limit is the preset minimum value for the account; and
   the balance of the account indicates the amount of money the subscriber still has in use.

9. A method as claimed in claim 8, wherein at least the second set of services comprises a depositing service.

10. A method as claimed in claim 9, wherein the depositing service utilizes authentication of the communication system when authenticating the one who wants to deposit.

11. A method as claimed in claim 1, wherein the subscription further has subscription information maintained in the communication system; the method further comprising adding to the subscription information at least one of the first range of allowed IP addresses and the second range of allowed IP addresses.

12. A communication system comprising:
    a first node configured to monitor a balance of an account;
    a memory configured to store definitions of at least a first set of services associated with a first access point name and a second set of services associated with a second access point name to be used with a subscription, each set of services defining services accessible via the subscription,
    wherein the first node compares the balance of the account with the first limit, and selects, in response to the result of the comparison, a range of allowed IP addresses to be used with this connection for accessing one of said first and second set of services,
    wherein the first range of allowed IP addresses is selected when the balance of the account does not reach the first limit and the second range of allowed IP addresses is selected when the balance reaches the first limit; the communication system being configured to provide the subscription with the account and at least a first limit.

13. An apparatus comprising:
    a processor; and
    memory including computer program code;
    the memory and the computer program code configured to, with the processor, cause the apparatus at least to perform:
    associating a first range of allowed IP addresses with a first set of services, and a second range of allowed IP addresses with a second set of services, both sets of services defining services accessible via the subscription;
    comparing a balance of an account with a first limit;
    selecting, in response to the result of the comparison, a range of allowed IP addresses to be used for accessing one of said first and second set of services,
    wherein the first range of allowed IP addresses is selected when the balance of the account does not reach the first limit and the second range of allowed IP addresses is selected when the balance reaches the first limit; the apparatus being in a communication system configured to provide the subscription with the account and at least a first limit, the apparatus being further configured to monitor the balance of the account.

14. An apparatus comprising:
    a processor; and
    memory including computer program code;
    the memory and the computer program code configured to, with the processor, cause the apparatus at least to perform:
    associating a first range of allowed IP addresses with a first set of services and a second range of allowed IP addresses with the second set of services, both sets of services defining services accessible via a subscription;
    communicating with a second apparatus;
    comparing a balance of an account with a first limit;
    selecting in response to the result of the comparison, range of allowed IP addresses to be used for accessing one of said first and second set of services, wherein the first range of allowed IP addresses is selected when the balance of the account does not reach the first limit and the second range of allowed IP addresses is selected when the balance reaches the first limit, and
    indicating to the second apparatus the selected range of allowed IP addresses; the apparatus being in a communication system configured to provide the subscription with the account and at least a first limit, the apparatus being further configured to monitor the balance of the account.

15. A apparatus as claimed in claim 14, wherein the apparatus is configured to indicate the selected range of allowed IP addresses in response to the balance reaching the limit and in response to the balance not any more reaching the limit and in response to the balance not any more reaching the limit.

16. An apparatus comprising:
a processor; and
memory including computer program code;
the memory and the computer program code configured to, with the processor, cause the apparatus at least to perform:
storing a first range of allowed IP addresses used in a communication system to define where and how to connect a user of a subscription;
providing access to a first set of services accessible to the subscription using the first range of allowed IP addresses;
receiving from the communication system a second range of allowed IP addresses indicating the use of a second set of services instead of the first set of services for the for the subscription, and, in response to receiving the second range of allowed IP addresses,
modifying the stored first range of allowed IP addresses with the received second range of allowed IP addresses, and
providing access only to services included in the indicated second set of services accessible to the subscription using the second range of allowed IP addresses; the apparatus being in a communication system configured to provide the subscription.

17. An apparatus as claimed in claim 16, wherein the apparatus is configured, in response to receiving the indication, to inform the user of the subscription of the services accessible via the indicated certain set of services.

18. A apparatus as claimed in claim 16, wherein the apparatus is an application server.

19. A processor comprising:
memory including computer program code;
the memory and the computer program code configured to cause an apparatus in a communication system at least to perform:
providing a subscription with an account and at least a first limit;
associating a first access range of allowed IP addresses with a first set of services, and a second range of allowed IP addresses with a second set of services, both sets of services defining services accessible via the subscription;
monitoring a balance of the account;
comparing a balance with the first limit;
selecting, in response to the result of the comparison, a range of allowed IP addresses to be used for accessing one of said first and second set of services in response to the result of the comparison, wherein
the first range of allowed IP is selected when the balance of the account does not reach the first limit and
the second range of allowed IP addresses is selected when the balance reaches the first limit.

20. A processor comprising:
memory including computer program code;
the memory and the computer program code configured to cause an apparatus in a communication system at least to perform:
providing a subscription with an account and at least a first limit;
associating a first range of allowed IP addresses with a first set of services, and a second range of allowed IP addresses with a second set of services, both sets of services defining services accessible via the subscription;
communicating with a second apparatus;
comparing a balance with the first limit;

selecting, in response to the result of the comparison, a range of allowed IP addresses to be used for accessing one of said first and second set of services, wherein
the first range of allowed IP addresses is selected when the balance of the account does not reach the first limit and
the second range of allowed IP addresses is selected when the balance reaches the first limit; and
indicating, in a form of the selected range of allowed IP addresses to the second apparatus, which set of services from among at least two different sets of services defined for the subscription is the allowed set of services on the basis of said comparison.

21. A processor as claimed in claim 20, further comprising program code configuring the apparatus to indicate the allowed set of services in response to the balance reaching the limit and in response to the balance not any more reaching the limit.

22. A processor comprising:
memory including computer program code;
the memory and the computer program code configured to cause an apparatus in a communication system at least to perform:
providing a subscription,
storing a first range of allowed IP addresses used in the communication system to define where and how to connect a user of the subscription;
providing access to a first set of services accessible to the subscription using the first range of allowed IP addresses;
receiving from a communication system a second range of allowed IP addresses indicating the use of a second set of services instead of the first set of services for the subscription; and, in response to receiving the indication, to
modify the stored first range of allowed IP addresses with the received second range of allowed IP addresses, and
provide access only to services included in the indicated second set of services using the second range of allowed IP addresses.

23. A processor as claimed in claim 22, further comprising program code configuring the apparatus to, in response to receiving the indication, inform the user of the subscription of the services accessible via the indicated certain set of services.

24. A computer readable storage medium encoding and storing a computer program of instructions therein for executing a computer process for determining services accessible via a subscription having an account and at least a first limit in a communication system, the process comprising:
defining at least a first set of services and a second set of services to be used with the subscription, each set of services defining services accessible via the subscription;
defining a first range of allowed IP addresses for the first set of services; and
defining a second range of allowed IP addresses for the second set of services;
comparing a balance of the account with the first limit;
selecting, in response to the result of the comparison, a range of allowed IP addresses to be used for accessing one of said first and second set of services, wherein
the first range of allowed IP addresses is selected when the balance of the account does not reach the first limit; and
the second range of allowed IP addresses is selected when the balance reaches the first limit.

* * * * *